United States Patent
Paulus et al.

(10) Patent No.: US 7,624,114 B2
(45) Date of Patent: Nov. 24, 2009

(54) AUTOMATICALLY GENERATING WEB FORMS FROM DATABASE SCHEMA

(75) Inventors: Polita Mila Paulus, Kirkland, WA (US); Bradley D. Millington, Bellevue, WA (US); Kashif Alam, Kirkland, WA (US); Scott David Guthrie, Bellevue, WA (US); Shanku Shivabrata Niyogi, Bellevue, WA (US); Brian Matthew Goldfarb, Seattle, WA (US); Matthew E. Gibbs, Redmond, WA (US); Andres Sanabria, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 117 days.

(21) Appl. No.: 11/446,630

(22) Filed: Jun. 5, 2006

(65) Prior Publication Data

US 2007/0282869 A1 Dec. 6, 2007

(51) Int. Cl.
 *G06F 17/00* (2006.01)
 *G06F 7/00* (2006.01)
(52) U.S. Cl. .............................. 707/100; 707/1; 707/4; 707/5; 707/101; 707/103 R
(58) Field of Classification Search ....................... None
See application file for complete search history.

(56) References Cited

U.S. PATENT DOCUMENTS

| | | | |
|---|---|---|---|
| 5,499,371 A * | 3/1996 | Henninger et al. | 717/108 |
| 5,717,919 A * | 2/1998 | Kodavalla et al. | 707/8 |
| 5,717,924 A | 2/1998 | Kawai | |
| 5,937,409 A * | 8/1999 | Wetherbee | 707/103 R |
| 6,067,568 A | 5/2000 | Li et al. | |
| 6,192,380 B1 | 2/2001 | Light et al. | |
| 6,226,635 B1 * | 5/2001 | Katariya | 707/4 |
| 6,850,941 B1 | 2/2005 | White et al. | |
| 7,027,997 B1 * | 4/2006 | Robinson et al. | 705/9 |
| 2001/0037345 A1 * | 11/2001 | Kiernan et al. | 707/513 |
| 2002/0049831 A1 | 4/2002 | Platner et al. | |
| 2002/0087346 A1 * | 7/2002 | Harkey | 705/1 |
| 2002/0091702 A1 * | 7/2002 | Mullins | 707/100 |
| 2002/0173929 A1 * | 11/2002 | Seigel | 702/130 |

(Continued)

OTHER PUBLICATIONS

Prados, F. et al, "An Automatic Correction Tool for Relational Database Schemas", Information Technology Based Higher Education and Training, 2005. ITHET 2005. 6th International Conference on Jul. 7-9, 2005.

(Continued)

*Primary Examiner*—Yicun Wu
*Assistant Examiner*—Yu Zhao
(74) *Attorney, Agent, or Firm*—Workman Nydegger

(57) ABSTRACT

The present invention extends to methods, systems, and computer program products for creating Web forms with automatically generated links. A database mapping for a database is accessed. One or more dynamic queries for querying a database are automatically formulated. The dynamic queries are included in an automatically generated Web site for the database in accordance with the database mapping. User-selected links are also included for executed the dynamic queries. Selection of a link causes a corresponding dynamic query to execute. Relationships between tables in a database can be inferred even when a relationship is not expressly described in schema describing the database. Dynamic queries can be any of sorting, pagination, addition, deletion, and modification queries.

13 Claims, 10 Drawing Sheets

U.S. PATENT DOCUMENTS

| | | | |
|---|---|---|---|
| 2003/0055830 A1* | 3/2003 | Gutierrez-Rivas et al. | 707/100 |
| 2003/0172084 A1* | 9/2003 | Holle | 707/101 |
| 2004/0205533 A1 | 10/2004 | Lopata et al. | |
| 2004/0237045 A1* | 11/2004 | Meltzer | 715/530 |
| 2005/0060647 A1* | 3/2005 | Doan et al. | 715/514 |
| 2005/0172223 A1* | 8/2005 | Gibbons et al. | 715/517 |
| 2005/0216356 A1 | 9/2005 | Pearce et al. | |
| 2005/0257148 A1 | 11/2005 | Goodman et al. | |
| 2005/0262517 A1 | 11/2005 | French | |
| 2006/0064674 A1 | 3/2006 | Olson et al. | |
| 2006/0085342 A1 | 4/2006 | Chen et al. | |
| 2006/0085451 A1 | 4/2006 | Pal et al. | |

OTHER PUBLICATIONS

Thiran, Philippe, et al. "Database Wrappers Development: Towards Automatic Generation", Proceedings of the Ninth European Conference on Software Maintenance and Reengineering (CSMR'05), 2005 IEEE.

O. Corcho, A Gómez-Pérez, A. López-Cima, V. López-García, M.C. Suárez-Figueroa "ODESeW. Automatic Generation of Knowledge Portals for Intranets and Extranets", 16 pages http://www.cs.man.ac.uk/~ocorcho/documents/ISWC2003_CorchoEtAl.pdf.

Jamia Prakash M. Nadkarni, MD, Cynthia M. Brandt, MD, and Luis Marenco, MD "WebEAV Automatic Metadata-driven Generation of Web Interfaces to Entity-Attribute-Value Databases" 23 pages Journal List > J Am Med Inform Assoc < v.7(4); Jul.-Aug. 2000 http://www.pubmedcentral.nih.gov/articlerender.fcgi?artid=61439.

Andreas Eberhart "Automatic Generation of Java/SQL Based Inference Engines from RDF Schema and RuleML" 1 page vol. 2342 / 2002 Jun. 9-12, 2002 http://www.springerlink.com/(wc130fn0gxp5un55tn4ndb455)/app/home/contribution.asp?referrer=parent&backto=issue,10,42;journal,1578,3811;linkingpublicationresults,1:105633,1.

* cited by examiner

Orders Table

Create New Order

| | Product Name | Product ID | Order ID | Customer ID | Unit Price | Units Shipped | |
|---|---|---|---|---|---|---|---|
| Edit Delete | Outback Lager | 37 | 1026 | 1 | 15.00 | 42 | View Details |
| Edit Delete | Boston Crab Meat | 49 | 997 | 8 | 18.40 | 49 | View Details |
| Edit Delete | Spiced Ocra | 187 | 1005 | 2 | 17.00 | 187 | View Details |
| Edit Delete | Dill Pickles | 112 | 875 | 3 | 12.10 | 112 | View Details |
| Edit Delete | Hamburger | 6 | 1102 | 6 | 7.40 | 6 | View Details |

Page 1 2 3 4
Pages 511

FIG. 5B

View All Customers

| Details For Customer | |
|---|---|
| Customer ID | 8 |
| Company Name | XYZ Corp. |
| Address | 123 Main St. |
| City | Chicago |
| Region | |
| Country | USA |
| Postal Code | 12345 |
| Phone | |
| Fax | |
| View Orders | |
| Edit | |

Orders Details Table For Customer XYZ Corp.

| | Customer ID | Order ID | Prod ID | Product Name | Unit Price | Quantity | Discount | |
|---|---|---|---|---|---|---|---|---|
| Edit Delete | 8 | 862 | 23 | Whole Fryers | 6.50 | 40 | 0 | ViewDetails |
| Edit Delete | 8 | 997 | 49 | Boston Crab Meat | 18.40 | 123 | 0 | ViewDetails |
| Edit Delete | 8 | 1087 | 112 | Dill Pickles | 11.90 | 30 | 0.05 | ViewDetails |
| Edit Delete | 8 | 1087 | 86 | Dinner Rolls | 1.25 | 85 | 0 | ViewDetails |

AUTOMATICALLY GENERATING WEB FORMS FROM DATABASE SCHEMA

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, the performance of many computing tasks are distributed across a number of different computer systems and/or a number of different computing components.

In many network based applications, data access, data manipulation, and data presentation are facilitated through a user-interface to underlying data, such as, for example, to database tables. To standardize functionality, user-interfaces can be presented in a Web based format such that any user with access to a Web browser can interact with the underlying data. For example, data can be presented through one or more Web based forms that allow a user to access and manipulate the data.

To create a Web based form, a form designer typically manually designs a data layer and a presentation layer. The data layer interacts with the underlying data in response to commands from the presentation layer (e.g., to issue queries to a database) and provides data to the presentation layer (e.g., the results of database queries). A form designer can also manually build other functionality, such as, for example, filtering, master-details, server-based pagination, and edit, deletion, and insertion commands, into a data layer. For example, a data layer can filter query results in accordance with other criteria to return an appropriate set of data to the presentation layer.

A presentation layer provides a user-interface between a user and a data layer. The presentation layer accepts user commands and forwards user commands (in an appropriate format) to the data layer. The presentation layer also accepts data from the data layer and presents data (in an appropriate format) to the user. Thus, to access and manipulate data in a database, a user can direct a Web browser to the appropriate Web based form.

Some Web form development platforms utilized partially automated techniques for generating Web based forms. For example, at least one platform supports automatic displaying, editing, updating, and deleting functionality. However, these platforms still require manual activities to obtain other functionality. For example, filtering, pagination, and sorting typically require manual intervention even using these development platforms. Thus, even when using partially automated techniques, considerable resources can still be consumed to manually add additional functionality.

BRIEF SUMMARY

The present invention extends to methods, systems, and computer program products for automatically generating Web forms from database schema. In some embodiments, a database mapping for a database is accessed. The database mapping is generated from schema describing the configuration of data contained in the database, including describing a foreign key relationship from a first table to a second table of the database. It is inferred, from the existence of the foreign key relationship, that a relationship from the second table to the first table is also relevant, even though a relationship from the second table to the first table is not expressly described in the schema.

A Web site for the database is automatically generated in accordance with the database mapping. The Web site is configured to provide a plurality of navigable linked Web based forms for interacting with the data. A first Web based form is used to interact with data from the first table. The first Web based form is configured with a navigable link to a second Web based form that utilizes the inferred relationship to provide a view of the first table in the context of a row from the second table.

In other embodiments, a database mapping for a database is accessed. The database mapping is generated from schema describing the configuration of data contained in the database. A dynamic query configured to query a database table included in the database is automatically generated. The dynamic query is executable in response to a user initiated command to change the arrangement of records from the database table within a Web based form. The dynamic query is configured to request records from the database table that are to be presented in the Web based form in the order they are to be presented such that the entire database table need not be queried.

A Web site for the database is automatically generating in accordance with the database mapping. The Web site includes the automatically formulated dynamic query so as to allow users to automatically change the arrangement of records from the database table within the Web based form.

Dynamic queries for other types of operations, such as, for example, inserts, deletes, and updates, can also be formulated and included in automatically generated Web forms.

In further embodiments, records from a database table are forwarded to a Web browser so that the records can be presented through a Web based form in accordance with a first configuration. A received user initiated message from the Web browser indicates that presentation of records through the Web based form is to be changed to a second different configuration. A dynamic query is issued to the database in response to the user initiated message. The dynamic query requests records from the database table that are to be presented in the second different configuration in the order they are to be presented such that the entire database table need not be queried. The dynamic query having been automatically included in a Web site for the database table when the Web site was created The requested records are received in the order they are to be presented, the received records being received in response to the dynamic query. The requested records are forwarded to the Web browser in the order they are to be presented so that the requested records can be presented through the Web based form in accordance with the second different configuration.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 5A-5E illustrate examples of Web forms.

DETAILED DESCRIPTION

Figure 1:
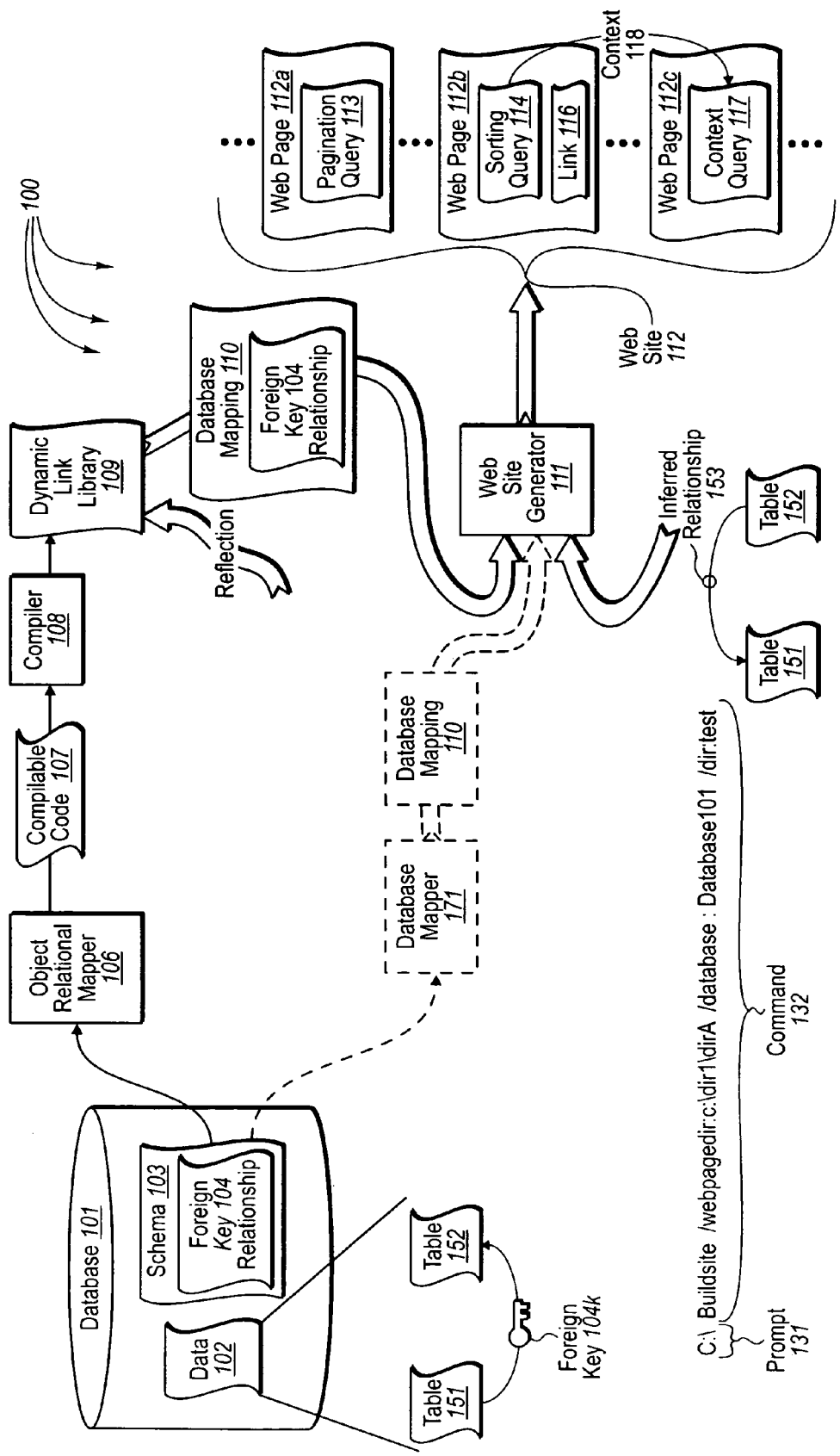
FIG. 1 illustrates an example computer architecture that facilitates automatically generating Web forms from database schema.

The present invention extends to methods, systems, and computer program products for automatically generating Web forms from database schema. In some embodiments, a database mapping for a database is accessed. The database mapping is generated from schema describing the configuration of data contained in the database, including describing a foreign key relationship from a first table to a second table of the database. It is inferred, from the existence of the foreign key relationship, that a relationship from the second table to the first table is also relevant, even though a relationship from the second table to the first table is not expressly described in the schema.

A Web site for the database is automatically generated in accordance with the database mapping. The Web site is configured to provide a plurality of navigable linked Web based forms for interacting with the data. A first Web based form is used to interact with data from the first table. The first Web based form is configured with a navigable link to a second Web based form that utilizes the inferred relationship to provide a view of the first table in the context of a row from the second table.

In other embodiments, a database mapping for a database is accessed; The database mapping is generated from schema describing the configuration of data contained in the database. A dynamic query configured to query a database table included in the database is automatically generated. The dynamic query is executable in response to a user initiated command to change the arrangement of records from the database table within a Web based form. The dynamic query is configured to request records from the database table that are to be presented in the Web based form in the order they are to be presented such that the entire database table need not be queried.

A Web site for the database is automatically generating in accordance with the database mapping. The Web site includes the automatically formulated dynamic query so as to allow users to automatically change the arrangement of records from the database table within the Web based form.

Dynamic queries for other types of operations, such as, for example, inserts, deletes, and updates, can also be included in automatically generated Web forms.

In further embodiments, records from a database table are forwarded to a Web browser so that the records can be presented through a Web based form in accordance with a first configuration. A received user initiated message from the Web browser indicates that presentation of records through the Web based form is to be changed to a second different configuration. A dynamic query is issued to the database in response to the user initiated message. The dynamic query requests records from the database table that are to be presented in the second different configuration in the order they are to be presented such that the entire database table need not be queried. The dynamic query is automatically included in a Web site for the database table when the Web site was created.

The requested records are received in the order they are to be presented, the records are received in response to the dynamic query. The requested records are forwarded to the Web browser in the order they are to be presented so that the requested records can be presented through the Web based form in accordance with the second different configuration.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates example computer architecture 100 that facilitates creating Web forms with automatically generated links. Computer architecture 100 includes database 101, object relational mapper 106, compiler 108, and Web site generator 111. In some embodiments, database mapper 171 is also included (potentially replacing object relational mapper 106 and compiler 108). Each of the components in computer architecture 100 be connected to a network, such as, for example, a Local Area Network ("LAN"), a Wide Area Network ("WAN"), or even the Internet. Thus, the various components can receive data from and send data to each other, as well as other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), etc.) over the network.

As depicted, database 101 includes data 102 and schema 103. Data 102 can include one or more tables, such as, for example, table 151 and table 152. Each table can be configured with one or more columns representing different fields of the table. Each table can include one or more rows of data, where each row contains values for the data fields of each corresponding column in the table.

Schema 103 defines the structure of data 102 and can be described in a formal language compatible with database 101. For example, schema 103 can define tables of database 101 and the data fields (e.g., as integer, string, key, etc.) included in each table of database 102. Schema 103 can also define relationships (e.g., foreign key relationships) between fields and tables in data 102. A foreign key is a key field in one table that identifies records in a different table. For example, schema 103 can define foreign key relationship 104 from table 151 to table 152. That is, a key field in table 151 identifies records in table 152 (represented generally by foreign key 104K).

Object relation mapper 106 is configured to examine schema and convert the schema into representative compilable code (e.g., C# source code). For example, object relational mapper 106 can request, receive, and parse schema 103 and convert schema 103, including foreign key relationship 104, into representative compilable code 107. Representative compilable code 107 can include source code for classes and subclasses that represent the tables and fields of the data 102 defined in accordance with schema 103. The compilable code can be annotated with metadata, for example, field attributes, representing portions of schema 103, including foreign key relationship 104.

Compiler 108 is configured to compile compilable code into executable code, such as, for example, a dynamic link library. For example, compiler 108 can compile compilable code 107 into dynamic link library 109. After compilation, a dynamic link library can retain metadata annotations that were included in the corresponding compilable code. Thus, any metadata annotations included in compilable code 107 can also be included in dynamic link library 109.

Generally, metadata annotations in a dynamic link library (of other executable code) can be identified through reflection. Thus, any metadata annotations in dynamic link library 109 can be identified through reflection. From identified-metadata annotations, database mapping 110 can be created. Database mapping 110 can include description of database 101 included in schema 103, such as, for example, foreign key relationship 104.

In some embodiments, a database mapper is utilized (potentially replacing object relational mapper 106 and compiler 108 and potentially eliminating the need to use reflection). A database mapper can be configured to read schema directly and convert the schema into a corresponding database mapping. For example, database mapper 171 can be configured to read schema 103 and convert schema 103 into database mapping 110.

Web site generator 111 is configured to receive a database mapping for a database and automatically generate a Web site for interacting with the database. For example, Web site generator 111 can receive database mapping 110 and generate Web site 112 for interacting with database 101. Web site 112 can include a plurality of Web pages, such as, for example, Web pages 112a, 112b, and 112c, presenting different arrangements of data for interacting with database 101.

Generally, Web site generator 111 is configured to automatically include various links in Web pages that assist in efficient and meaningful interaction with database 101. For example, Web site generator 111 can automatically include Web page links that cause dynamic queries to be issued to database 101. Dynamic queries can be used to request records from a table that are to be presented in a Web based form in the order they are to be presented, without having to query an entire table. Associating dynamic queries with Web page links facilitates executing the dynamic queries in response to user initiated commands selecting a link (e.g., "clicking" a mouse button when a user-interface cursor is hovering over a link).

For example, Web page links can be automatically included in a Web page to sort records of a table by a specified column. In response to a user initiated command selecting a soft link, appropriate code for causing a dynamic sorting query (e.g., sorting query 114) for the appropriate records and/or performing other appropriate database operations can be automatically issued to database 101. The appropriate records can be returned and the presented arrangement of records altered to reflect the user requested sorting (e.g., sorting by customer identifier field).

Web page links can also be automatically included in a Web page to move forwards and/or backwards between different pages of records (pagination). In response to a user initiated command selecting a pagination link, a dynamic pagination query (e.g., pagination query 113) for the appropriate records can be automatically issued to database 101. The appropriate records can be returned and the presented arrangement of records altered to reflect the user requested pagination (e.g., moving from page 2 to page 5 of a group of records).

The follow pseudo-code represents an example of a dynamic query that issued to sort and/or page records from an Orders table:

```
public ICollection<Orders> GetOrders(string sortExpression,
int startRowIndex, int maximumRows)
{
    return db.Orders.SortAndPage(sortExpression, startRowIndex,
        maximumRows);
}
```

Web site generator 111 is also configured to infer relationships between tables in database from schema information included in database mapping (even when the relationships are not expressly defined in the schema information). Thus, Web site generator 111 can infer relationships between tables in data 102 even if schema 103 does not expressly define (or otherwise represent) a relationship. For example, foreign key relationship 104 defines that a field in table 151 points to records in table 152. From foreign key relationship 104, Web site generator 111 can infer a relationship from table 152 to back table 151 (inferred relationship 153), even if no other foreign key (or other) relationships are expressly defined in schema 103.

Web page links can also be automatically included in a Web page to move to a different data view or data arrangement in the context of an inferred relationship. In response to a user initiated command selecting a link in the context of an inferred relationship, appropriate code for causing a dynamic context query (e.g., context query 117) for the appropriate records and/or performing other appropriate database operations can be automatically issued to database 101. The appropriate records can be returned and the presented arrangement of records altered to reflect the user requested context (e.g., switching from a view of all orders to a view of orders for a specified customer).

The follow pseudo-code represents an example of a dynamic query that can be used to query an orders table in the context of a row from a customer table:

```
public ICollection<Orders> GetOrdersByCustomer(int customerID)
{
    Database db = new Database( );
    return db.Customers.Where(x=>x.CustomerID ==
        customerID).SelectMany(x=>x.Orders);
}
```

Web page links can also be automatically included in a Web page to insert, delete, or modify data. In response to a user initiated command selecting a link to delete, modify, or add data, appropriate code for causing a dynamic query and/or performing other appropriate database operations can be automatically issued to database 101. For example, a Web page can be configured to issue any of an addition query, modification query, and deletion query. The appropriate records can be returned and/or deleted and the presented arrangement of records altered to reflect the user rations (e.g., deleting, modifying, adding a record etc.).

The follow pseudo-code represents an example of a dynamic query for deleting a row from an Orders table:

```
public static void Delete(Order x)
{
    Database db = new Database( );
    db.Orders.Remove(x);
    db.SubmitChanges( );
}
```

The follow pseudo-code represents an example of a dynamic query for modifying a row in an Orders table:

```
public static void Update(Order original__x, Order x)
{
    Database db = new Database( );
    db.Orders.Attach(original__x);
    original__x.CustomerID = x.CustomerID;
    original__x.EmployeeID = x.EmployeeID;
    original__x.OrderDate = x.OrderDate;
    original__x.RequiredDate = x.RequiredDate;
    original__x.ShippedDate = x.ShippedDate;
    original__x.ShipVia = x.ShipVia;
    original__x.Freight = x.Freight;
    original__x.ShipName = x.ShipName;
    original__x.ShipAddress = x.ShipAddress;
    original__x.ShipCity = x.ShipCity;
    original__x.ShipRegion = x.ShipRegion;
    original__x.ShipPostalCode = x.ShipPostalCode;
    original__x.ShipCountry = x.ShipCountry;
    db.SubmitChanges( );
}
```

The follow pseudo-code represents an example of a dynamic query for adding a row to an Orders table:

```
// This method inserts a new record in the table.
// Change this method to alter how records are inserted.
public static void Insert(Order x)
{
    Database db = new Database( );
    db.Orders.Add(x);
    db.SubmitChanges( );
}
```

A link in one Web page can be configured to cause a dynamic query in another Web page to be executed. For example, selecting link 116 in Web page 112b can cause a context 118 to be provided as input to context query 117. Context query 117 can then issue requesting records that are within context 118.

Combinations of various different queries can also be included in a Web page or in linked Web pages. The combinations of different queries can interoperate to query database 101 for appropriate data, for example, in response to user-initiated commands.

Initiation of automatically building a Web site can be facilitated through a command line tool. For example, at prompt 131 a user can issue command 132. Command 132 includes the name of a build module (e.g., "buildsite"), the directory where the generated Web site is to be stored (e.g., "/webpage-dir"), the database the Web site is being built for ("/database"), and a virtual directory that can be used to access the Web site ("/vdir"). A component in computer architecture 100, such as, for example, an Internet Information Service ("IIS"), can map the virtual directory to a URL. Optional database credentials can also be included in command 132. Alternately, integrated security can be used alleviating the need to included credentials in command 132. Other graphical tools can also be used to initiate a build of a Web site for a database.

Figure 2:
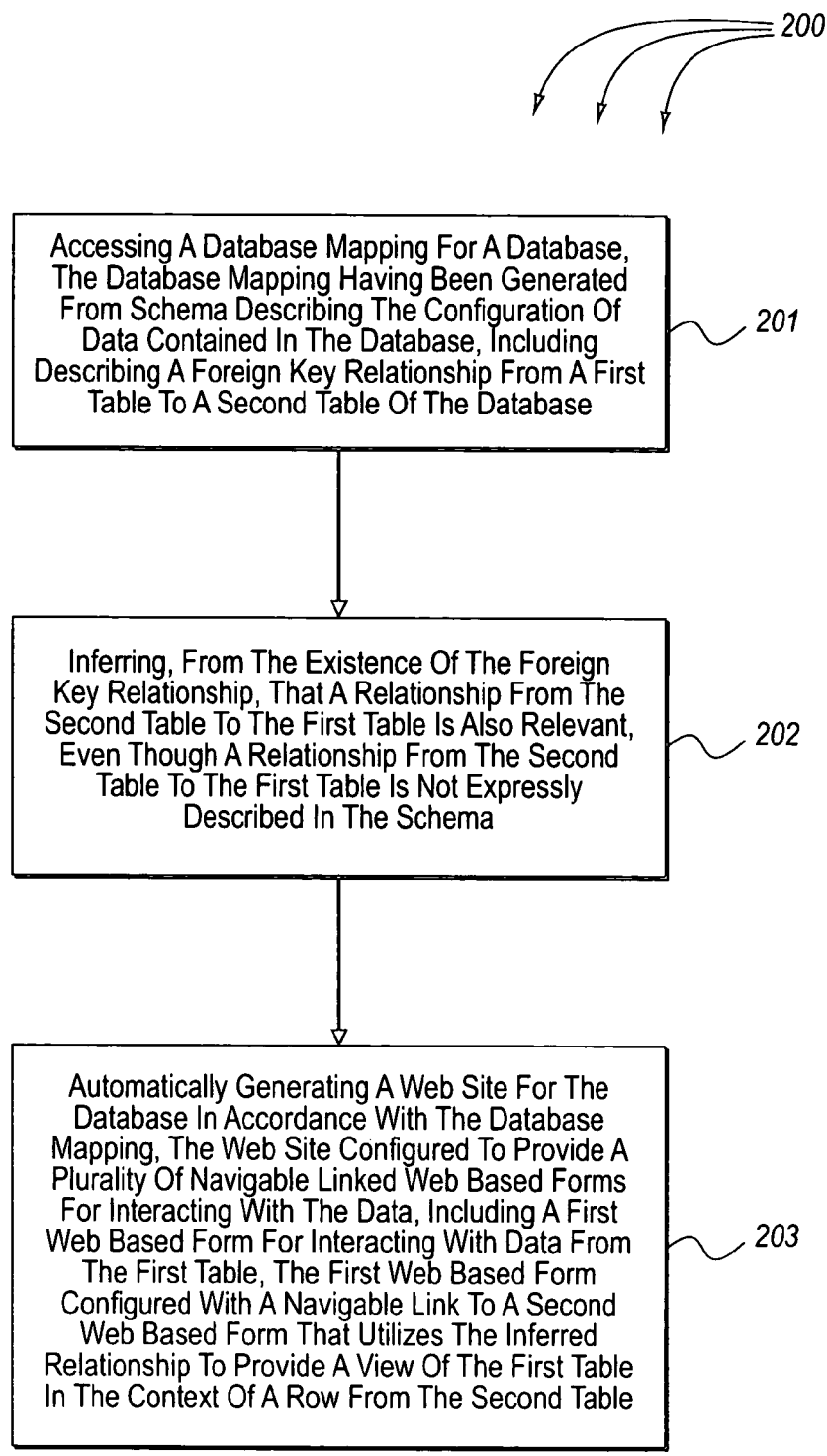
FIG. 2 illustrates a flow chart of an example method for generating a Web form.

FIG. 2 illustrates a flow chart of an example method 200 for creating a Web form. Method 200 will be described with respect to the components and data in computer architecture 100.

Method 200 includes an act of accessing a database mapping for a database, the database mapping having been generated from schema describing the configuration of data contained in the database, including describing a foreign key relationship from a first table to a second table of the database (act 201). For example, Web site generator 111 can access database mapping 110 that was generated from schema 103 describing the configuration of database 101 and that described foreign key relationship 104 from table 151 to table 152.

Method 200 includes an act inferring, from the existence of the foreign key relationship, that a relationship from the second table to the first table is also relevant, even though a relationship from the second table to the first table is not expressly described in the schema (act 202). For example, Web site generator 111 can infer, from foreign key relationship 104, that a relationship from table 152 to table 151 is also relevant even though a relationship from table 152 to table 151 is not expressly described in schema 103.

Context query 117, configured to query database 101 for data in the context of the inferred relationship 153, can be formulated automatically. Context query 117 can be executable in response to a user initiated command to change the arrangement of records from table 151 within a Web based form. Context query 117 can be configured to request records from table 151 that are to be presented in a Web based form in the context of inferred relationship 153.

Method 200 includes an act of automatically generating a Web site for the database in accordance with the database mapping (act 203). The Web site is configured to provide a plurality of navigable linked Web based forms for interacting with the data. A first Web based form is for interacting with data from the first table. The first Web based form configured with a navigable link to a second Web based form that utilizes the inferred relationship to provide a view of the first table in the context of a row from the second table.

For example, Web site generator 111 can create Web site 112 in accordance with database mapping 110. Web site 112 includes navigable linked Web pages 112a, 112b, 112c, etc., for interacting with data 102. Web page 112b can configured more specifically for interacting with table 151 and can include link 116 to Web page 112c. Link 116 utilizes inferred relationship 153 to provide view of table 151 in the context of a row from table 152. For example, link 116 can be selected to transition from a view of all orders in table 151 to a view of all orders for a specified customer represented by a row in table 152. (An appropriate dynamic query can be issued to database 101 to retrieve all orders for the specified customer in response to selecting link 116).

Figure 3:
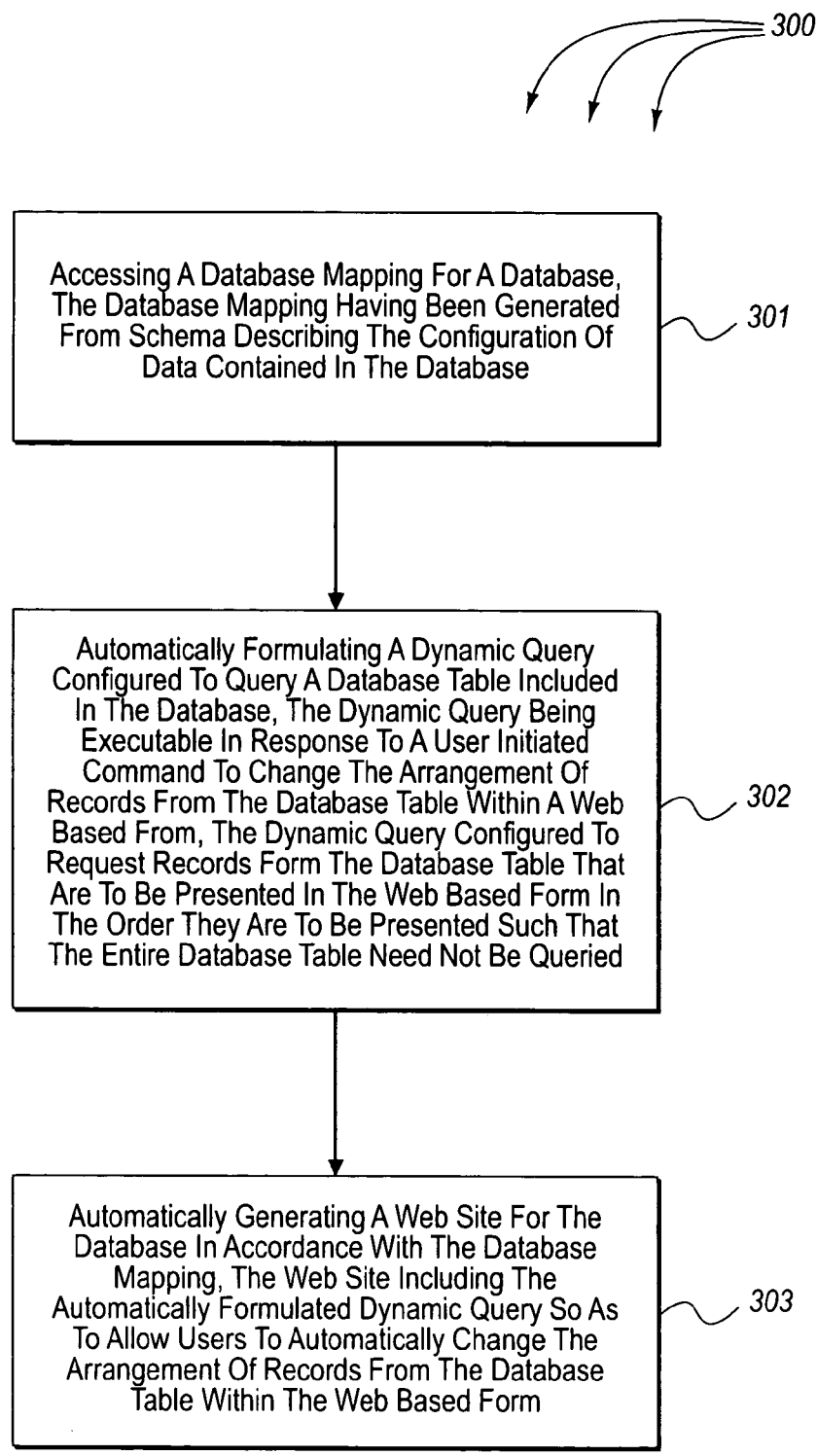
FIG. 3 illustrates a flow chart of another example method for generating a Web form.

FIG. 3 illustrates a flow chart of another example method for creating a Web form. FIG. 2 illustrates a flow chart of an example method 200 for creating a Web form. Method 300 will be described with respect to the components and data in computer architecture 100.

Method 300 includes an act of accessing a database mapping for a database, the database mapping having been generated from schema describing the configuration of data contained in the database (act 301). For example, Web site generator 111 can access database mapping 110 that was generated from schema 103 describing the configuration of data contained in database 101.

Method 300 includes an act of automatically formulating a dynamic query configured to query a database table included in the database (act 302). The dynamic query is executable in response to a user initiated command to change the arrangement of records from the database table within a Web based form. The dynamic query is configured to request specific records from the database table that are to be presented in the Web based form in the order they are to be presented such that the entire database table need not be queried.

For example, Web site generator 111 can automatically formulate pagination query 113 or sorting query 114. Either of pagination query 113 or sorting query 114 can be executed in response to a user initiated command to change the arrangement of records from table 151 within a Web based form. Pagination query 113 or sorting query 114 can be configure to request specific records from table 151 that are to be presented in the Web based form in the order they are to be presented such that entire table 151 need not be queried.

Method 300 includes an act of automatically generating a Web site for the database in accordance with the database mapping (act 303). The Web site includes the automatically formulated dynamic query so as to allow users to automatically change the arrangement of records from the database table within the Web based form. For example, Web site generator 111 can automatically generate Web site 112 in accordance with database mapping 110. Web page 112a includes pagination query 113 and Web page 112b includes sorting query 114 allow users to automatically change the arrangement of records from table 151 within the Web based form.

Figure 4:
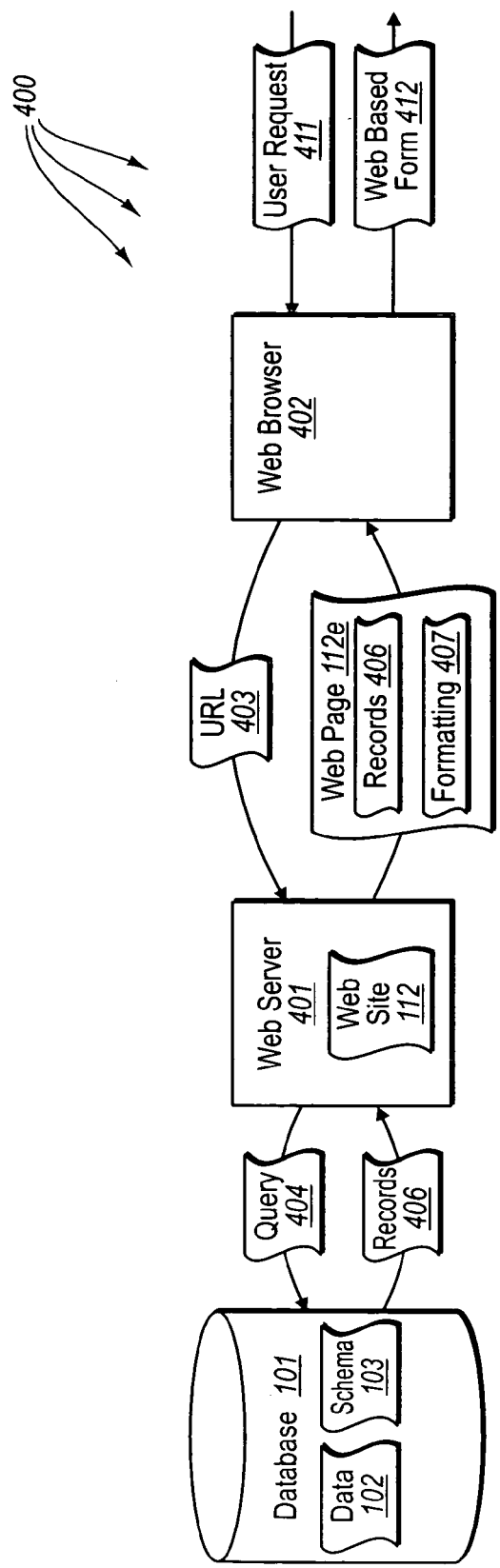
FIG. 4 illustrates an example computer architecture that facilitates executing Web forms with automatically generated links.

FIG. 4 illustrates an example computer architecture 400 that facilitates executing Web forms with automatically generated links. As depicted, computer architecture 400 includes database 101, Web server 401, and Web browser 402. Web browser 402 is configured to provide a user-interface to a user for interacting with content served by Web server 401, including automatically generated Web site 112. Web browser 402 can receive user-input and submit Web based commands to Web server 401 in response to received user-input. For example, Web browser 402 can receive user-request 411 and submit URL 403 in response to user request 411. Web browser 401 can also receive database records and formatting information and present the database records in accordance with the formatting information in a Web based form. For example, Web browser 402 can receive Web page 112e, including records 406 and formatting 407, and can present records 406 in Web based form 412 in accordance with formatting 407.

Web server 401 is configured to receive Web based commands from Web browser 402 and identify and access content in response to received Web based commands. For example, Web server 401 can receive URL 403 and access data 102 in response to URL 403. (A component, such as, for example, IIS, can map URL 403 to the location of data 102.) Web server 401 can execute dynamic queries included in Web site 112 to request records form database 101. For example, Web server 401 can execute pagination query 113 to request a new page of records from table 151. Web server 401 can receive content from database 101 and return the content to Web browser 402. For example, Web server 401 can receive records 406 (e.g., representing a new page of records from table 151). Web server 401 can include records 406 and formatting 407 in Web page 112e (another page in automatically generated Web site 112). Web server 401 can send Web page 112e to Web browser 402.

Figure 5A:
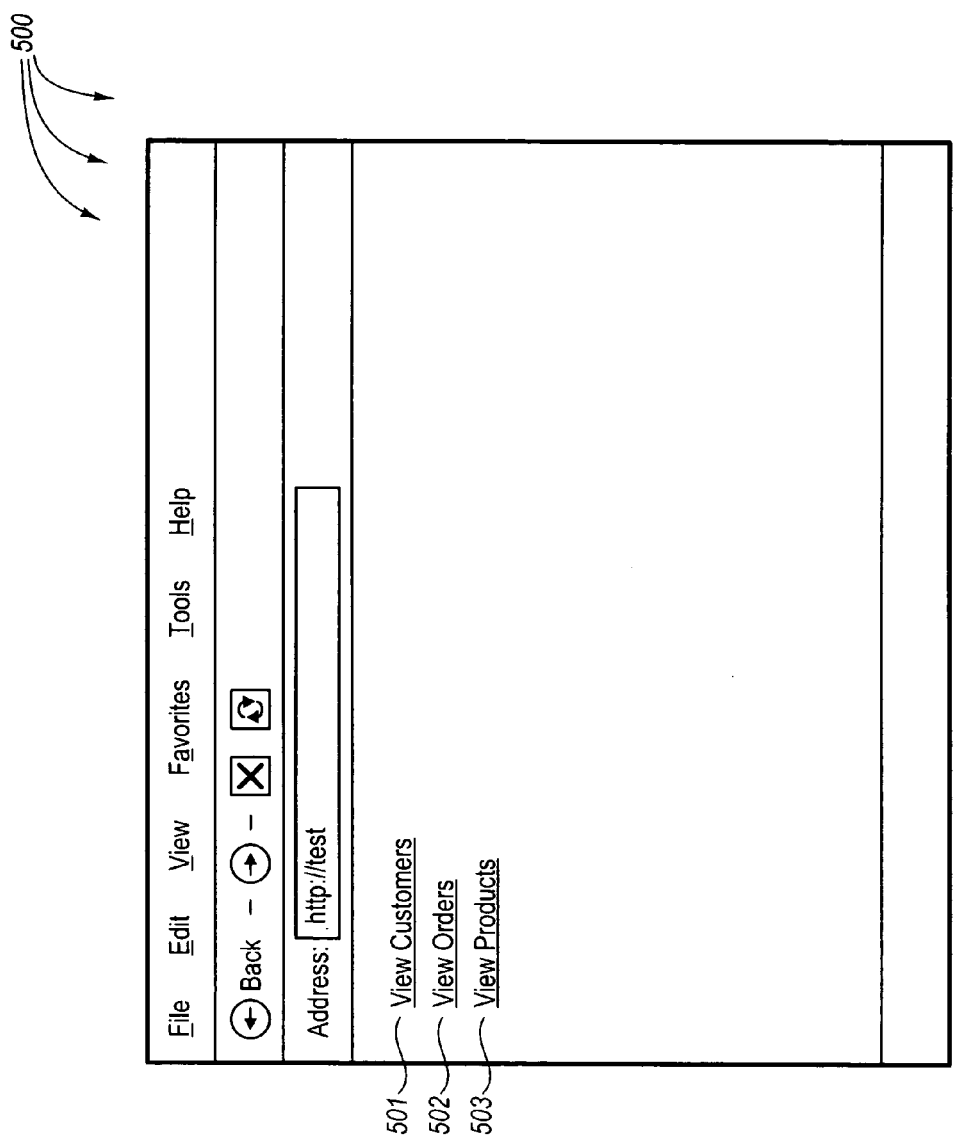
Figure 5C:
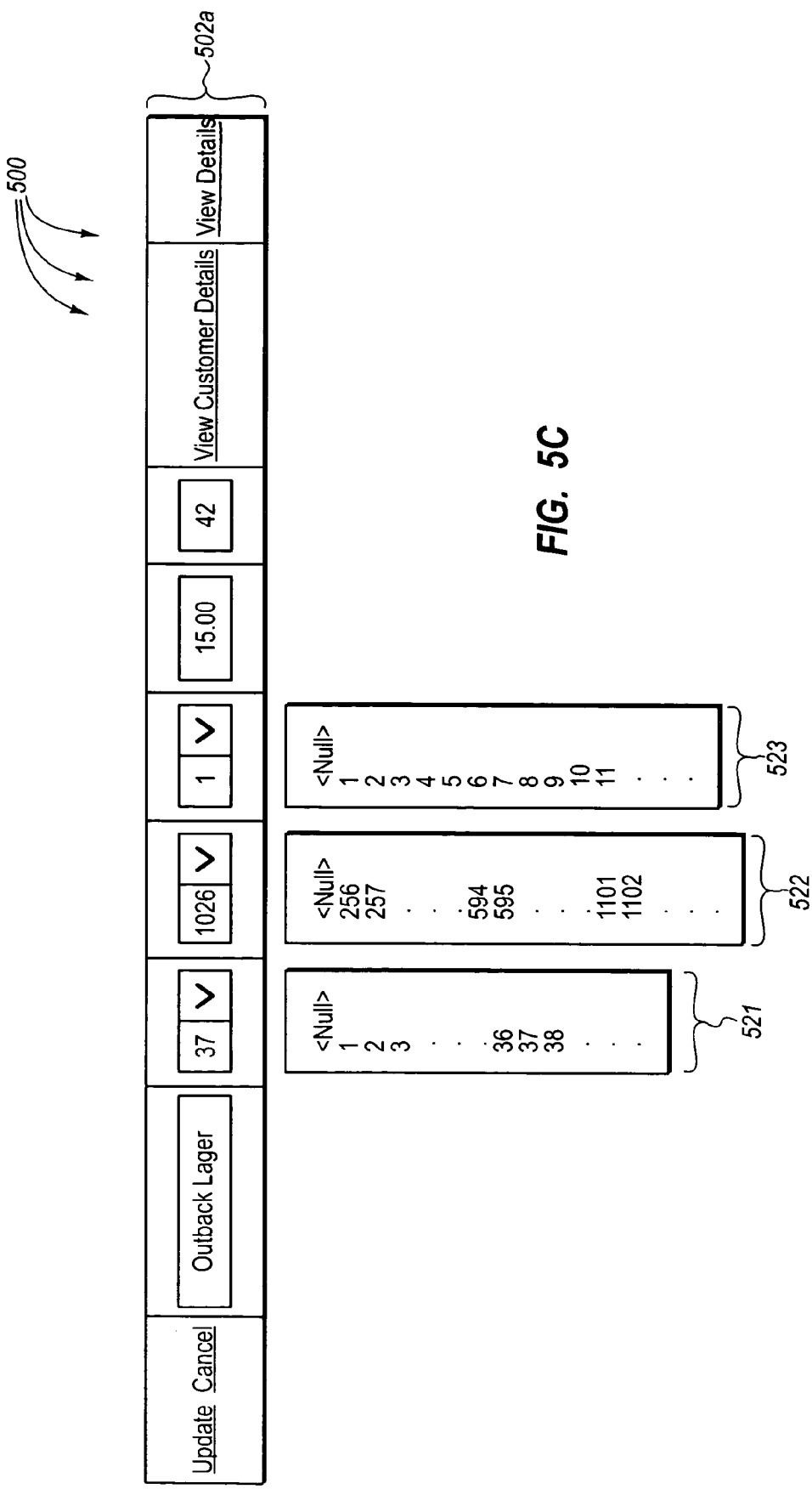

FIGS. 5A-5E illustrate examples of Web forms 500. FIG. 5A depicts a main menu Web based form. Each item in FIG. 5A can represent a link to a table in a database. For example, item 501 can represent a link to a Customers table, item 502 can represent a link to an Orders table, and item 503 can represent a link to a Products table.

Selecting an item in FIG. 5A can cause records from a linked table to be presented. For example, selecting item 502 can cause Web server 401 to issue a query for records from the Orders table. FIG. 5B depicts a portion of an Orders table presented in response to selection of item 502. Rows 502a, 502b, 502c, 502d, and 502e, correspond to rows in an Orders table. Edit and Delete links associated with each row allow a user to modify or delete the row. Column 513 represents a ViewDetails link that can be selected to present a different arrangement of the details of a corresponding Order.

Page 511 represents the number of pages of Orders that are available. Selection of link for a specified page (e.g., page 3) can cause a pagination query to be issued for records that are to appear of that page. Various columns in the FIG. 5B include links that can be used to sort the presented rows. For example, links 531, 532, 533, 534, 535, and 536 can be used to sort the Orders table by Product Name, Product ID, Order ID, Customer ID, Unit Prices, and Units Shipped respectively. Selecting (e.g., clicking) a link can cause the rows to be sorted in ascending order in the context of a specified column. Selecting the link again (e.g., clicking again) can cause the rows to be sorted in descending order in the context of a specified column. For example, selecting link 532 can cause the rows to be sorted in ascending order by Product ID value. Selecting link 532 again causes the rows to be sorted in descending order by ProductID value. Selecting a link for a specified column (e.g., link 532 for the ProductID column) can cause a dynamic sorting query to be issued for set of sorted records, according to sort criteria specified by the user's action.

When edit link for a row is selected editable fields for values of the row can be presented. For example, selected the Edit link for row 502a can cause FIG. 5C to be presented. The presented editable fields can include the current value for the field. When a field represents a foreign key relationship a drop down list of available foreign key values can be provided. For example, available values for ProductID (from a products table) can be presented in drop down list 521, available values for OrderID (from an orders table) can be presented in drop down list 522, and available values for CustomerID (from a customers table) can be presented in drop down list 523.

Values can be selected and/or altered within the editable fields. If entered edits are to be implementing the Update link can be selected (e.g., clicked). If entered edits are not to be selected the Cancel link can be selected (e.g., clicked).

Within a column, values can also be links. These links can represent links to other tables that have a foreign key relationship to another table. For example, within the ProductID column, presented values can also include links to a Products table. A user can select (e.g., click) a link to be taken to more detailed information for a selected item. For example, in row 502b the link in the CustomerID column can be selected to see more detailed information about the customer corresponding to a CustomerID value of 8. FIG. 5D is an example of more detailed information for the customer corresponding to the CustomerID value of 8.

As depicted, FIG. 5D presents more detailed information including CompanyName, Address, Postal Code, etc. FIG. 5D also includes link 512. Selecting link 512 can cause a dynamic query to be issued to an Orders table in the context of CustomerID value 8 (XYZ corp.). The results of the dynamic query can be presented in another Web based form. For example, FIG. 5E depicts a table of Orders in the context of CustomerID value 8. That is, rows 502f, 502b, 502g, and 502h represent orders for CustomerID value 8.

Figure 6:
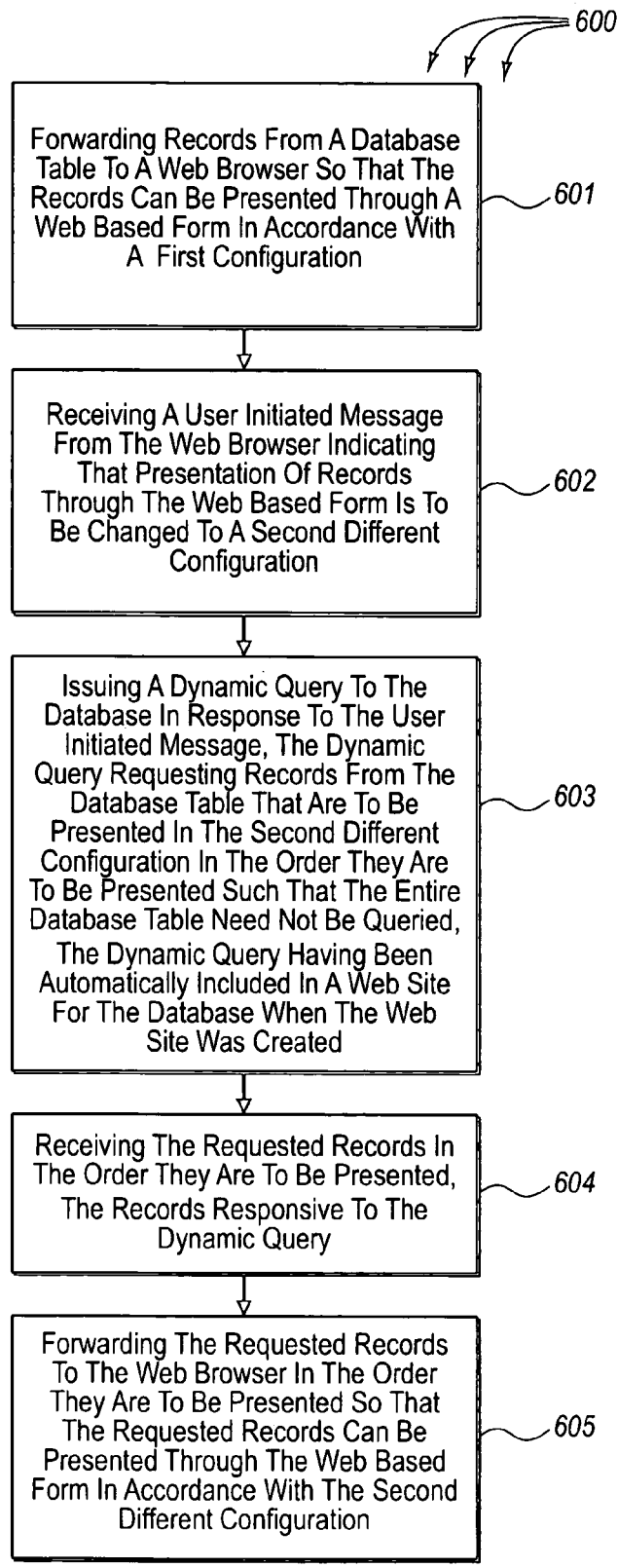
FIG. 6 illustrates a flow chart of an example method for executing a Web form.

FIG. 6 illustrates a flow chart of an example method 600 for executing a Web form. Method 600 will be described with respect the components and data in computer architecture 400 and Web forms 500.

Method 600 includes an act of forwarding records from a database table to a Web browser so that the records can be presented through a Web based form in accordance with a first configuration (act 601). For example, Web server 401 can forward records from table 151 so that the records can be presented through the Web form in FIG. 5B at Web browser 402.

Method 600 includes an act of receiving a user initiated message from the Web browser indicating that presentation of records through the Web based form is to be changed to a second different configuration (act 602). For example, Web server 401 can receive URL 403 form Web browser 402. URL 403 indicates that presentation of records through the Web form in FIG. 5B is to be changed to a second different configuration.

Method 600 includes an act of issuing a dynamic query to the database in response to the user initiated message (act 603). The dynamic query requests records from the database table that are to be presented in the second different configuration in the order they are to be presented such that the entire database table need not be queried. The dynamic database query was automatically included in Web site 112 when Website 112 was created. The dynamic query can also be associated with an inferred relationship between different database tables.

For example, Web server 401 can issue query 404 to database 101. Query 404 can be a pagination query, a sorting query, a context query, or any other kind of dynamic query that Web site generator 111 automatically included in Web site 112. Query 404 can query for specified records in database 101 without querying the entire table. The records can be for a different page of records from a current table, for a sorted page of records from a current table, or for records from a current table in the context of a row from another table.

Method 600 includes an act of receiving the requested records in the order they are to be presented, the records responsive to the dynamic query (act 604). For example, Web server 401 can receive records 406 representing a response to query 404.

Method 600 includes an act forwarding the requested records to the Web browser in the order they are to be presented so that the requested records can be presented through the Web based form in accordance with the second different configuration (act 605). For example, Web server 401 can send Web page 112e, including records 406 and formatting 407, to Web browser 402. Web page 112e can represent a different page of records from a current table, sorted records from a current table, records from a current table in the context of a row from another table (e.g., FIG. 5D). etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a processor and system memory, a method for generating a Web based user-interface for interacting with a database, the method comprising:

an act of accessing a schema that defines a plurality tables in the database, the schema also defining relationships between fields in the plurality of tables of the database, definition of field relationships by the schema including defining a foreign key relationship from a first table to a second table of the database indicative of a key field in the first table identifying records in the second table;

an act of converting the schema, including the foreign key relationship, into source code, the source code including classes and subclasses that represent relationships between the plurality of tables and fields defined in accordance with the schema;

annotating the source code with a metadata annotation representing the foreign key relationship from the first table to the second table, the metadata annotation indicating the basis for creation of any classes or subclasses based on the foreign key relationship indicative of a key field in the first table identifying records in the second table;

an act of generating executable code from the source code, including:

compiling classes and subclasses of the source code into executable code of a dynamic link library, the executable code obscuring any indication of the relationships between the plurality of tables and fields in the database in the source code; and retaining the metadata annotations from the source code in the executable code of the dynamic link library, including a metadata annotation representing the foreign key relationship indicative of a key field in the first table identifying records in the second table;

an act of identifying the metadata annotations from within the executable code of the dynamic link library, including the metadata annotation representing the foreign key relationship indicative of a key field in the first table identifying records in the second table, for use in creating a database mapping for the database;

an act of the processor creating a database mapping for the database from the metadata annotations, the database mapping describing the configuration of the database such that the database mapping is based on the schema and retains an indication of the foreign key relationship indicative of a key field in the first table identifying records in the second table in a format processable by a Web site generator;

an act of the Web site generator inferring, from the existence of the foreign key relationship from the first table to the second table, that a relationship from the second table back to the first table is also relevant to navigating Web based forms that present data from the database, even though a relationship from the second table to the first table is not expressly described in the schema, the inferred relationship for use in generating additional functionality in a Web site for the database permitting traversal of a navigable link from the second table back to the first table; and an act of the Web site generator generating a Web site for the database in accordance with the database mapping, the Web site including at least one navigable link from the second table back to the first table based on the inferred relationship, the at least one navigable link implementing the inferred relationship from the second table back to the first table, the Web site configured to provide a plurality of navigable linked Web based forms for interacting with the tables and fields of the database, including a first Web based form for interacting with data from the second table, the first Web based form configured with a navigable link that can be selected to automatically formulate a dynamic query for querying database records from the first table in the context of a row from the second table.

2. The method as recited in claim 1, wherein the act of indentifying metadata annotations comprises an act of using reflection to identifying metadata annotations in the executable code.

3. The method as recited in claim 1, wherein the act of inferring, from the existence of the foreign key relationship, that a relationship from the second table back to the first second table is also relevant comprising an act of inferring that values for a field in the second table represented by the foreign key in the first table can be included in a plurality of rows in the first table.

4. The method as recited in claim 1, wherein the act of automatically generating a Web site for the database in accordance with the database mapping comprises an act including the dynamic query in the automatically generated Web site.

5. The method as recited in claim 1, wherein the act of automatically generating a Web site for the database in accordance with the database mapping comprises an act of automatically generating a Web site that includes links for executing dynamic queries to the database to perform at least of one sorting records from the first table and paging through records from the first table.

6. At a computer system including a processor and system memory, a method for generating a Web based user-interface for interacting with a database, the method comprising:

an act of accessing a schema that defines a plurality tables in the database, the schema also defining relationships between fields in the plurality of tables of the database, definition of field relationships by the schema including defining a foreign key relationship from a first table to a second table of the database indicative of a key field in the first table identifying records in the second table;

an act of converting the schema, including the foreign key relationship, into source code, the source code including classes and subclasses that represent relationships between the plurality of tables and fields defined in accordance with the schema; annotating the source code with a metadata annotation representing the foreign key relationship from the first table to the second table, the metadata annotation indicating the basis for creation of any classes or subclasses based on the foreign key relationship indicative of a key field in the first table identifying records in the second table;

an act of generating executable code from the source code, including:

compiling classes and subclasses of the source code into executable code of a dynamic link library, the executable code obscuring any indication of the relationships between the plurality of tables and fields in the database in the source code; and retaining the metadata annotations from the source code in the executable code of the dynamic link library, including a metadata annotation representing the foreign key relationship indicative of a key field in the first table identifying records in the second table;

an act of identifying the metadata annotations from within the executable code of the dynamic link library, including the metadata annotation representing the foreign key relationship indicative of a key field in the first table identifying records in the second table, for use in creating a database mapping for the database;

an act of the processor creating a database mapping for the database from the identified metadata annotations the database mapping describing the configuration of the database such that the database mapping is based on the schema and retains an indication of the foreign key relationship indicative of a key field in the first table identifying records in the second table in a format processable by a Web site generator;

an act of automatically formulating a dynamic query configured to query a database table included in the database, the dynamic query being executable in response to a user initiated command to change the arrangement of records from the database table within a Web based form, the dynamic query configured to request records from the first table that are to be presented in the Web based form in the order they are to be presented such that the entire database table need not be queried, the dynamic query for implementing one of: a pagination query, an addition query, a deletion query, and a modification query; and an act of automatically generating a Web site for the database in accordance with the database mapping, the Web site including a link for executing the automatically formulated dynamic query so as to allow users to query the database to automatically change the arrangement of records from the database presented at the Web site, the Web site including at least one navigable link from the second table back to the first table, the at least one navigable link implementing the inferred relationship from the second table back to the first table based on the metadata annotation representing the foreign key relationship indicative of a key field in the first table identifying records in the second table.

7. The method as recited in claim 6, wherein the act of identifying metadata annotations comprises an act of using reflection to identify metadata annotations in the executable code.

8. The method as recited in claim 6, wherein the act of automatically formulating a dynamic query configured to query a database table comprises an act formulating a dynamic query for one or more of sorting, deleting, adding, and modifying records in the database table.

9. The method as recited in claim 8, wherein the act of formulating a dynamic query for sorting records in the database table comprises an act formulating a dynamic query that can toggle between sorting records of the database table in ascending and descending order based on values in one of fields of the records.

10. The method as recited in claim 6, wherein the act of automatically formulating a dynamic query configured to query a database table comprises an act formulating a dynamic query for paging through records in the database table.

11. The method as recited in claim 6, wherein the act of automatically generating a Web site for the database in accordance with the database mapping comprises an act of including a user-selectable link that can be selected to execute a sorting query.

12. The method as recited in claim 6, wherein the act of automatically generating a Web site for the database in accordance with the database mapping comprises an act of including a user-selectable link that can be selected to execute a query to records form a first table in the context of a row form a second table.

13. A computer system, the computer system comprising:
one or more processors;
system memory;
one or more computer storage media having stored thereon computer-executable instructions representing in an object relational mapper, a compiler, and a Web site generator, wherein the object relational mapper is configured to:
access a schema that defines a plurality tables in the database, the schema also defining relationships between fields in the plurality of tables of the database, definition of field relationships by the schema including defining a foreign key relationship from a first table to a second table of the database indicative of a key field in the first table identifying records in the second table;
convert the schema, including the foreign key relationship, into source code the source code including classes and subclasses that represent relationships between the plurality of tables and fields defined in accordance with the schema; and
annotate the source code with a metadata annotation representing the foreign key relationship from the first table to the second table, the metadata annotation indicating the basis for creation of any classes or subclasses based on the foreign key relationship indicative of a key field in the first table identifying records in the second table;
wherein the compiler is configured to:
generate executable code from the source code, including:
compiling classes and subclasses of the source code into executable code of a dynamic link library, the executable code obscuring any indication of the relationships between the plurality of tables and fields in the database in the source code; and
retaining the metadata annotations from the source code in the executable code of the dynamic link library, including a metadata annotation representing the foreign key relationship indicative of a key field in the first table identifying records in the second table;
wherein the processor:
identifies the metadata annotations from within the executable code of the dynamic link library, including the metadata annotation representing the foreign key relationship indicative of a key field in the first table identifying records in the second table, for use in creating a database mapping for the database; and
creates a database mapping for the database from the metadata annotations, the database mapping describing the configuration of the database such that the database mapping is based on the schema and retains an indication of the foreign key relationship indicative of a key field in the first table identifying records in the second table in a format processable by the Web site generator; and
wherein the Web site generator is configured to:
infer, from the existence of the foreign key relationship from the first table to the second table that a relationship from the second table back to the first table is also relevant to navigating Web based forms that present data from the database, even though a relationship from the second table to the first table is not expressly described in the schema, the inferred relationship for use in generating additional functionality in a Web site for the database permitting traversal of a navigable link from the second table back to the first table; and generate a Web site for the database in accordance with the database mapping, the Web site including at least one navigable link from the second table back to the first table based on the inferred relationship, the at least one navigable link implementing the inferred relationship from the second table back to the first the Web site configured to provide a plurality of navigable linked Web based forms for interacting with the tables and fields of the database, including a first Web based form for interacting with rows of data from the second table, the first Web based form configured with a navigable link back to a second Web based form that utilizes the inferred relationship to provide a view back to the first table in the context of a row from the second table, wherein selecting the navigable link back to the second Web based form issues a dynamic query back to the database to change the arrangement of records that are displayed at the Web site so as to provide the view back to the first table in the context of a row from the second table, the dynamic query for implementing one of: a pagination query, an addition query, a deletion query, and a modification query.

* * * * *

UNITED STATES PATENT AND TRADEMARK OFFICE
CERTIFICATE OF CORRECTION

| | | |
|---|---|---|
| PATENT NO. | : 7,624,114 B2 | Page 1 of 1 |
| APPLICATION NO. | : 11/446630 | |
| DATED | : November 24, 2009 | |
| INVENTOR(S) | : Polita Mila Paulus et al. | |

It is certified that error appears in the above-identified patent and that said Letters Patent is hereby corrected as shown below:

In column 8, line 1, after "query," insert -- a --.

Signed and Sealed this
Seventeenth Day of May, 2011

David J. Kappos
*Director of the United States Patent and Trademark Office*